(12) United States Patent
Morita et al.

(10) Patent No.: US 6,930,159 B1
(45) Date of Patent: Aug. 16, 2005

(54) FLUORINATED ALLYL ETHER POLYMER

(75) Inventors: Shigeru Morita, Settsu (JP); Hirotoshi Sakashita, Settsu (JP); Takayuki Araki, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/936,495

(22) PCT Filed: Mar. 10, 2000

(86) PCT No.: PCT/JP00/01453

§ 371 (c)(1),
(2), (4) Date: Sep. 11, 2001

(87) PCT Pub. No.: WO00/53647

PCT Pub. Date: Sep. 14, 2000

(30) Foreign Application Priority Data

Mar. 11, 1999 (JP) .................................. 11-064577

(51) Int. Cl.$^7$ .......................................... C08F 120/22

(52) U.S. Cl. ...................... 526/245; 526/247

(58) Field of Search ................. 526/247, 245

(56) References Cited

U.S. PATENT DOCUMENTS

| 5,670,593 A | 9/1997 | Araki et al. |
| 5,986,150 A | 11/1999 | Araki et al. |

FOREIGN PATENT DOCUMENTS

| EP | 728 776 A1 | 8/1996 |
| JP | 59 111 114 | 6/1984 |
| JP | 42 54 803 | 9/1992 |
| JP | 10237130 | 9/1998 |
| JP | 10329281 | 12/1998 |
| JP | 10329282 | 12/1998 |
| WO | 9533782 | 12/1995 |

OTHER PUBLICATIONS

R. C. Laible, Chemical Reviews (1958) pp. 806-843.

*Primary Examiner*—Bernard Lipman
(74) *Attorney, Agent, or Firm*—Birch, Stewart, Kolasch & Birch, LLP

(57) ABSTRACT

A fluorine-containing allyl ether polymer having a number average molecular weight of 1,000 to 1,000,000 and consisting of chains of at least one repeating unit of the formula:

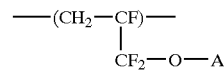

wherein A is an organic group having 1 to 100 carbon atoms.

3 Claims, No Drawings

FLUORINATED ALLYL ETHER POLYMER

This application is the national phase under 35 U.S.C. § 371 of PCT International Application No. PCT/JP00/01453 which has an International filing date of Mar. 10, 2000, which designated the United States of America and was not published in English.

FIELD OF THE INVENTION

The present invention relates to a fluorinated allyl ether polymer, in particular, a homo- or copolymer of 1,1,2-trifluoroallyl ether.

BACKGROUND ART

Hitherto, it is believed that hydrocarbon allyl compounds are hardly radically homopolymerized, and no homopolymer thereof having a high molecular weight can be obtained, and the reported molecular weight of the homopolymer is from about 300 to about 3,000 (see R. L. Shriner, L. Kelley ed. "Chemical Reviews" (USA), page 815, received by the National Diet Library (Japan) on Dec. 13, 1962).

Thus, various improvements have been made on comonomers copolymerizable with the allyl compounds. However, no publications other than the above reference has reported the homo- and copolymerization of the allyl compounds.

DISCLOSURE OF THE INVENTION

An object of the present invention is to provide a polymer of a fluorinated allyl ether having a high molecular weight, which is prepared by radial homopolymerization.

This object is achieved by a fluorinated allyl ether polymer having a number average molecular weight of 1,000 to 1,000,000 and consisting of chains of at least one repeating unit of the formula:

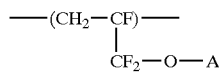  (1)

wherein A is an organic group having 1 to 100 carbon atoms, and a fluorinated allyl ether polymer having a number average molecular weight of 1,000 to 1,000,000 and represented by the formula:

$$CH_2=CFCF_2O—(CF_2O)_x—(CF_2CF_2O)_y—(CX^1_2CF_2CF_2O)_z—(CFX^2CF_2O)_w—CFX^3—R \quad (4)$$

wherein $X^1$ is a hydrogen atom, a fluorine atom or a chlorine atom, $X^2$ is a hydrogen atom, a chlorine atom, a methyl group or a trifluoromethyl group, $X^3$ is a hydrogen atom, a fluorine atom, a chlorine atom or a trifluoromethyl group, x, y, z and w are the same or different and a number of 0 to 20 provided that the sum of x, y, z and w is from 1 to 20, and R is —COOH, —COOR$^1$ in which R$^1$ is a hydrocarbon group having 1 to 20 carbon atoms, —CH$_2$OH, —CONH$_2$, —CF=CF$_2$, a hydrocarbon group having 1 to 20 carbon atoms or a perfluoroalkyl group having 1 to 20 carbon atoms.

The present invention is based on the finding that the specific allyl ether structure has good homopolymerizability and provides a polymer having a high molecular weight. That is, a fluorine-containing allyl ether compound of the formula:

$$CH_2=CFCF_2—O—A \quad (1a)$$

wherein A is an organic group having 1 to 100 carbon atoms has good homopolymerizability, in particular radical polymerizability, of the monomer of the formula (1a) due to the structure of the group: CH$_2$=CFCF$_2$—O— in the formula (1a), and provides a high molecular weight polymer. This is particularly different from other allyl compounds such as CF$_2$=CFCF$_2$OR, CF$_2$=CFCF$_2$R, etc. or vinyl ether compounds such as CF$_2$=CFOR, CH$_2$=CHOR, etc., which cannot be homopolymerized or which provide only low molecular weight products (oligomers), if they can be polymerized.

According to the present invention, insofar as the monomer has the group of the formula: CH$_2$=CFCF$_2$—O—, it can be radically polymerized irrespective of the kind of the group A, and the polymer of the formula (1) can be obtained.

DETAILED DESCRIPTION OF THE INVENTION

The fluorinated allyl ether polymer of the present invention consists of the chains of the repeating unit of the formula (1), and includes, for example, a copolymer of the formula:

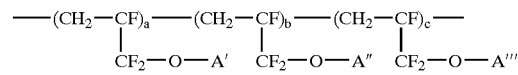

In this formula, the order of the repeating units may be random or block.

The above polymer may be compolymerized with less than 20% by mole, preferably less than 10% by mole of an ethylenically unsaturated compound copolymerizable with the above fluorinated allyl ether such as a fluorine-containing olefin.

The group A may be selected from any organic groups. In general, examples of the organic group include saturated or unsaturated aliphatic hydrocarbon groups having 1 to 50 carbon atoms, aromatic hydrocarbon groups having 4 to 30 carbon atoms, etc. At least one of hydrogen atoms of these hydrocarbon groups may be substituted with a fluorine atom.

Specific examples of the hydrocarbon groups include alkyl or fluoroalkyl groups having 1 to 50 carbon atoms, alkenyl or fluoroalkenyl groups having 2 to 50 carbon atoms, alkynyl or fluoroalkynyl groups having 2 to 50 carbon atoms, alkyl or fluoroalkyl groups having an ether bond and 1 to 60 carbon atoms, alkenyl or fluoroalkenyl groups having an ether bond and 2 to 60 carbon atoms, alkynyl or fluoroalkynyl groups having an ether bond and 2 to 60 carbon atoms, aryl or fluoroaryl groups having 4 to 30 carbon atoms, etc.

The hydrocarbon group may have a functional group. When the hydrocarbon group having the functional group is used, various functions are preferably imparted to the fluorinated allyl ether polymer obtained. A specific example of the repeating unit comprising the group A having the functional group is a repeating unit of the formula:

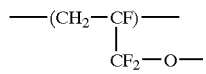 (2)

wherein $A^1$ is a divalent organic group having 1 to 60 carbon atoms, and $Y^1$ is —$CH_2OH$, —COOH, —$COOR^1$ in which $R^1$ is a hydrocarbon group

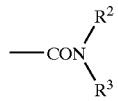

in which $R^2$ and $R^3$ are the same or different and a hydrogen atom or a hydrocarbon group having 1 to 20 carbon atoms, —O—CF=$CF_2$, or —OCO—$CZ^3$=$CZ^1Z^2$ in which $Z^1$ and $Z^2$ are the same or different and a hydrogen atom or a fluorine atom, and $Z^3$ is a hydrogen atom, a fluorine atom, a chlorine atom or a trifluoromethyl group.

Besides the group —$A^1$—$Y^1$, examples of the group A having the functional group include an epoxy group, a glycidyl group, a cyano group (—CN), a sulfonic acid group (—$SO_3H$), —$SO_3R'$ in which R' is a monovalent organic group, etc.

The group $A^1$ in the formula (2) maybe selected from divalent organic groups having 1 to 60 carbon atoms, preferably, divalent fluoroalkylene groups, divalent fluoroalkylene group having an ether bond, etc. These groups can impart various functions such as heat resistance, stainproofing, non-tackiness, optical properties (e.g. low refractive index), chemical resistance, electrical insulation, etc. to the polymer.

Specific examples of the divalent fluoroalkylene group include —$(CF_2)_m$—$(CH_2)_n$—, —$[CF_2CF(CF_3)]_m$—$(CH_2)_n$—, —$(CF_2CH_2)_m$—$(CH_2)_n$—, and —$[CF_2C(CF_3)_2]_m$—$(CH_2)_n$— wherein m is a number of 1 to 20, and n is a number of 0 to 10.

Specific examples of the divalent fluoroalkylene group having the ether bond include —$(CF_2CF_2O)_m$—$CF_2$—, —$(CF_2CF_2CF_2O)_m$—$CF_2CF_2$—, —$[CF(CF_3)CF_2O]_m$—$CF(CF_3)$—, and —$(CF_2O)_m$—$(CF_2)_k$— wherein m and k are the same or different and a number of 1 to 20.

Besides the above fluoroalkylene groups and the like, the group $A^1$ in the formula (2) may be one of the following hydrocarbon groups having 1 to 20 carbons:

- —$(CH_2)_m$— wherein m is a number of 1 to 20, a cyclohexylene group,
- —$(Ph)_a$—wherein Ph is a phenylene group and a is an integer of 1 to 3, —$(CH_2)_{m1}$—$(Ph)_a$—$(CH_2)_{m2}$— in which Ph and a are the same as defined above, m1 is a number of 1 to 5 and m2 is a number of 0 to 5,

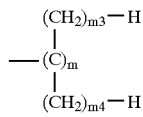

wherein m is a number of 1 to 20, m3 is a number of 0 to 10 and m4 is a number of 1 to 10, and the like.

One particularly preferable example of the repeating unit of the formula (1) is a repeating unit of the formula:

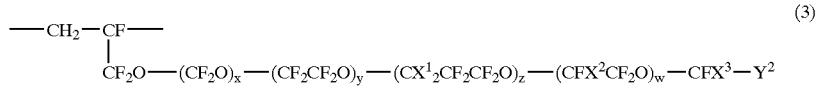 (3)

wherein $X^1$ is a hydrogen atom, a fluorine atom or a chlorine atom, $X^2$ is a hydrogen atom, a chlorine atom, a methyl group or a trifluoromethyl group, $X^3$ is a hydrogen atom, a fluorine atom, a chlorine atom or a trifluoromethyl group, x, y, z and w are the same or different and a number of 0 to 20 provided that the sum of x, y, z and w is from 1 to 20, and $Y^2$ is —COOH, —$COOR^4$ in which $R^4$ is a hydrocarbon group having 1 to 20 carbon atoms, —$CH_2OH$,

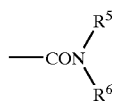

in which $R^5$ and $R^6$ are the same or different and a hydrogen atom or a hydrocarbon group having 1 to 20 carbon atoms, —O—CF=$CF_2$, or —OCO—$CZ^6$=$CZ^4Z^5$ in which $Z^4$ and $Z^5$ are the same or different and a hydrogen atom or a fluorine atom, and $Z^6$ is a hydrogen atom, a fluorine atom, a chlorine atom or a trifluoromethyl group.

Preferable examples of the fluorinated allyl ether (3) include $CH_2$=$CFCF_2OCF(CF_3)CF_2OCF(CF_3)COOCH_3$, $CH_2$=$CFCF_2OCF(CF_3)CF_2OCF(CF_3)CF_2OCF(CF_3)$ $COOCH_3$, $CH_2$=$CFCF_2OCF(CF_3)CF_2OCF(CF_3)$ COOH, $CH_2$=$CFCF_2OCF(CF_3)$ $CF_2OCF(CF_3)CF_2OCF(CF_3)$ COOH, $CH_2$=$CFCF_2OCF(CF_3)$ $CF_2OCF(CF_3)CH_2OH$, $CH_2$=$CFCF_2OCF(CF_3)CF_2OCF(CF_3)CF_2OCF(CF_3)$ $CH_2OH$, etc.

The preparation method of the fluorinated allyl ether (3) of the present invention will be explained. To simplify the formulas, "—$(CF_2O)_x$—$(CF_2CF_2O)_y$—$(CX^1{}_2CF_2CF_2O)_x$—$(CFX^2CF_2O)_w$—$CFX^3$—" will be represented by "Rf" in the following description.

The fluorinated allyl ether (3) of the present invention can be easily synthesized by defluoroiodination of a compound having a terminal iodine atom of the formula:

$ICH_2CF_2CF_2O$—Rf—R     (5).

The fluoroiodination is preferably carried out in a solvent (e.g. dimethylformamide, dimethylsulfoxide, methanol, acetone, methyl ethyl ketone, ethyl acetate, etc.) in the presence of a catalyst (e.g. zinc, copper, etc.) at a temperature of −20 to 200° C., preferably 50 to 150° C.

The polymer consisting of the chains of the repeating unit of the formula (1) of the present invention may be prepared as follows:

The homopolymerization of the fluorinated allyl ether (1) of the present invention is carried out by a conventional radial polymerization method under conventional radical polymerization conditions. Preferably, the radical polymerization using a radical initiating source (e.g. a radical polymerization initiator, light, heat, etc.) is used, and the polymerization mode may be bulk polymerization, solution polymerization, emulsion polymerization, suspension polymerization, etc.

The conditions employed in the radical polymerization are not limited and may include a temperature of 0 to 100° C. and a pressure of atmospheric pressure, a reduced pressure down to about 760 mmHg or an elevated pressure up to about 100 kg/cm².

Alternatively, a functional group can be introduced in the polymer obtained by reacting the polymer with a compound having a functional group.

For example, when a polymer, which is obtained by polymerizing the fluorinated allyl ether (4) having the —$CH_2OH$ group, is reacted with a compound of the formula: $CZ^1Z^2$=$CZ^3COF$ wherein $Z^1$ and $Z^2$ are the same as defined above, a group of the formula: —$CH^2OCO$—$CZ^3$=$CZ^1Z^2$ can be introduced in the polymer.

Alternatively, when a polymer obtained by polymerizing the fluorinated allyl ether (4) having the —$OCF(CF_3)COOH$ group is treated with sodium hydroxide, etc. to change this group to an alkali salt and then heated to decarboxylate the polymer, the —OCF=$CF_2$ group can be introduced in the polymer.

The fluorinated allyl ether of the present invention can provide a high molecular weight product through the radical homopolymerization, and when the fluorinated allyl ether having the functional group is used, the polymer having the functional group in the molecule can be easily obtained. Such polymers have various properties depending on the functional groups contained therein, and they may be used as solvent-resistant polymers, water-soluble polymers, ion-exchange resins, reactive polymers, etc.

The present invention will be explained in detail by the following examples.

EXAMPLE 1

$CH_2$=$CFCF_2OCF(CF_3)$ $CF_2OCF$ $(CF_3)COOCH_3$ (5 g) and a 8 wt. % solution of [$H(CF_2CF_2)_3COO$—]$_2$ (hereinafter referred to as "DHP") in trichlorotrifuoroethane (0.5 g) were charged in a glass vessel. When the internal atmosphere in the vessel was replaced with nitrogen and the mixture was stirred at room temperature for 24 hour, the viscosity of the mixture increased. Low boiling materials were distilled off from the reaction mixture under reduced pressure to obtain a colorless transparent polymer (4.67 g).

When a molecular weight was calculated on the assumption that the initiator efficiency was 1 (one), no chain transfer reaction took place, and the termination was only rebonding termination, it was 71,652. Hereinafter, the molecular weight calculated as above will be referred to as a "calculated molecular weight".

The polymer obtained was soluble in tetrahydrofuran (THF). The polymer was dissolved in THF, and its molecular weight was measured with GPC using polystyrene as a standard. A number average molecular weight was about 68,000. This number average molecular weight measured with GPC was in good agreement with the calculated molecular weight. Thus, in the following Examples, only calculated molecular weights are reported.

The polymer had Tg of −2° C. and a refractive index of 1.3132.

Herein, Tg was measured with DSC (differential scanning calorimeter), and a refractive index was measured with an Abbe refractometer.

EXAMPLE 2

$CH_2$=$CFCF_2OCF(CF_3)CF_2OCF(CF_3)CF_2OCF(CF_3)$ $CH_2OH$ was polymerized in the same manner as in Example 1, and a colorless transparent polymer (2.10 g) was obtained. It had a calculated molecular weight of 32,865, Tg of −4° C. and a refractive index of 1.3416.

EXAMPLE 3

$CH_2$=$CFCF_2OCF$ $(CF_3)CF_2OCF(CF_3)COOH$ was polymerized in the same manner as in Example 1, and a white polymer (4.77 g) was obtained. It had a calculated molecular weight of 74,651 and Tg of 13° C. This polymer was soluble in water, and pH of the aqueous solution (concentration: 1 wt. %) was about 2. The aqueous solution was foamable.

EXAMPLE 4

Polymerization was carried out in the same manner as in Example 1 except that $CH_2$=$CFCF_2OCF(CF_3)CF_2OCF$ $(CF_3)CH_2OH$ (5.0 g) and DHP (0.51 g) were used, and a colorless transparent polymer (4.68 g) was obtained. This polymer was a hard solid at room temperature, and it had a calculated molecular weight of 80,730.

EXAMPLE 5

Polymerization was carried out in the same manner as in Example 1 except that $CH_2$=$CFCF_2OCF(CF_3)$ $CF_2OCF$ $(CF_3)CF_2OCF(CF_3)COOCH_3$ (5.01 g) and DHP (0.53 g) were used, and a colorless transparent polymer (4.54 g) was obtained. This polymer was soft at room temperature, and it had a calculated molecular weight of 73,880.

EXAMPLE 6

$CH_2$=$CFCF_2OCF(CF_3)CF_2OCF(CF_3)CH_2OH$ (Monomer A) (14. g), $CH_2$=$CFCF_2OCF(CF_3)CF_2OCF(CF_3)$ $COOCH_3$ (Monomer B) (6 g) and DHP (8.29 g; 8 wt. % solution in perfluorohexane) were mixed with HCFC-225 (a mixture of 1,1-dichloro-2,2,3,3,3-pentafluoropropane and 1,3-dichloro-1,2,2,3,3-pentafluoropropane) (5 g), and the mixture was stirred at 30° C. for 24 hours.

The resulting solution was poured in petroleum benzine to precipitate the polymer formed.

The polymer precipitated was recovered, washed with petroleum benzine, and dried under reduced pressure to obtain a rubbery polymer (18 g).

According to NMR analysis, the polymer obtained was a copolymer containing Monomer A and Monomer B in a molar ratio of 81:19.

EXAMPLE 7

The fluorine-containing copolymer obtained in Example 6 (13 g) was dissolved in HCFC-225 (30 g), and the pyridine (0.61 g) was added to the solution, followed by cooling to 0 to 5° C. Then, CH$_2$=CFCOF (3.0 g) was gradually dropwise added to the solution while cooling with ice and stirring, and then the solution was stirred for additional 4 hours.

The polymer was precipitated washed and dried in the same manner as in Example 6 to obtain a rubbery polymer (10 g).

In the NMR chart of the obtained polymer, the absorption assigned to the OH groups disappeared, while the absorption assigned to >C=C< appeared.

According to NMR analysis, in the polymer obtained, the molar ratio of the monomer having —COOCH$_3$ to the monomer having —OCO—CF=CH$_2$ was 80:20.

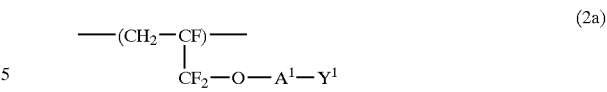

wherein A$^1$ is a divalent organic group having 1 to 60 carbon atoms, and Y$^1$ is —CH$_2$OH, —COOH, —COOR$^1$ in which R$^1$ is a hydrocarbon group having 1 to 20 carbon atoms,

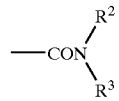

in which R$^2$ and R$^3$ are the same or different and a hydrogen atom or a hydrocarbon group having 1 to 20 carbon atoms, —O—CF=CF$_2$, —OCO—CZ$^3$=CZ$^1$Z$^2$ in which Z$^1$ and Z$^2$ are the same or different and a hydrogen atom or fluorine atom, and Z$^3$ is a hydrogen atom, a fluorine atom, a chlorine atom or a trifluoromethyl group, an epoxy group, a glycidyl group, a cyano group, a sulfonic acid group or a —SO$_3$R' in which R' is a monovalent organic group.

2. The fluorine-containing allyl ether polymer according to claim 1, wherein at least one of the repeating units is a repeating unit of the formula:

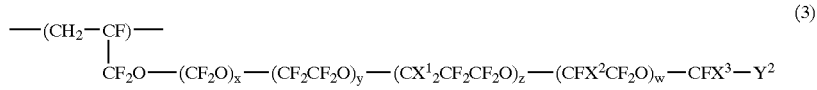

What is claimed is:

1. A fluorine-containing allyl ether copolymer consisting essentially of chains of at least two repeating units of the formula:

wherein A$^2$ is an organic group having 1 to 100 carbon atoms, wherein at least one repeating unit is a repeating unit of the formula:

wherein A is alkyl or fluoroalkyl groups having 1 to 50 carbon atoms, alkenyl or fluoroalkenyl groups having 2 to 50 carbon atoms, alkynyl or fluoroalkynyl groups having 2 to 50 carbon atoms, alkyl or fluoroalkyl groups having an ether bond and 1 to 60 carbon atoms, alkenyl or fluoroalkenyl groups having an ether bond and 2 to 60 carbon atoms, alkynyl or fluoroalkynyl groups having an ether bond and 2 to 60 carbon atoms, aryl or fluoroaryl groups having 4 to 30 carbon atoms, and at least one repeating unit is a repeating unit of the formula:

wherein X$^1$ is a hydrogen atom, a fluorine atom or a chlorine atom, X$^2$ is a hydrogen atom, a chlorine atom, a methyl group or a trifluoromethyl group, X$^3$ is a hydrogen atom, a fluorine atom, a chlorine atom or a trifluoromethyl group, x, y, z and w are the same or different and a number of 0 to 20 provided that the sum of x, y, z and w is from 1 to 20, and Y$^2$ is —COOH, —COOR$^4$ in which R$^4$ is a hydrocarbon group having 1 to 2 carbon atoms, —CH$_2$OH,

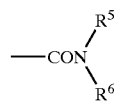

in which R$^5$ and R$^6$ are the same or a hydrocarbon group having 1 to 20 carbon atoms, —O—CF=CF$_2$, or —OCO—CZ$^6$=CZ$^4$Z$^5$ in which Z$^4$ and Z$^5$ are the same or different and a hydrogen atom or a fluorine atom, and Z$^6$ is a hydrogen atom, a fluorine atom, a chlorine atom or a trifluoromethyl group.

3. The fluorine-containing allyl ether polymer according to claim 1, wherein A$^1$ in the formula (2a) is a fluoroalkylene group having 1 to 60 carbon atoms or a fluoroalkylene group having an ether bond and 1 to 60 carbon atoms.

* * * * *